(12) United States Patent
Hori

(10) Patent No.: US 8,714,316 B2
(45) Date of Patent: May 6, 2014

(54) ELECTRIC BRAKE DEVICE

(75) Inventor: Hidekazu Hori, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 194 days.

(21) Appl. No.: 12/963,841

(22) Filed: Dec. 9, 2010

(65) Prior Publication Data

US 2011/0139555 A1 Jun. 16, 2011

(30) Foreign Application Priority Data

Dec. 10, 2009 (JP) .................................. 2009-280401

(51) Int. Cl.
*F16D 55/14* (2006.01)

(52) U.S. Cl.
USPC .......................................... 188/72.2; 188/72.7

(58) Field of Classification Search
USPC ................... 188/72.2, 265, 71.8, 72.7, 1.11 E; 303/112, 152, 20; 701/70, 71
See application file for complete search history.

(56) References Cited

U.S. PATENT DOCUMENTS

| | | | |
|---|---|---|---|
| 6,305,506 B1* | 10/2001 | Shirai et al. | 188/72.2 |
| 6,425,643 B2* | 7/2002 | Shirai et al. | 188/1.11 E |
| 7,289,897 B2* | 10/2007 | Yokoyama et al. | 701/70 |

FOREIGN PATENT DOCUMENTS

| | | |
|---|---|---|
| JP | 11-43041 | 2/1999 |
| JP | 11-321599 | 11/1999 |
| JP | 2002-160616 | 6/2002 |
| JP | 2004-050905 | 2/2004 |
| JP | 2006-321478 | 11/2006 |
| JP | 2009-280143 | 12/2009 |
| WO | WO 2008092729 A1 * | 8/2008 |

* cited by examiner

*Primary Examiner* — Melanie Torres Williams
(74) *Attorney, Agent, or Firm* — Drinker Biddle & Reath LLP

(57) ABSTRACT

An electric brake device includes a brake pad, an axial force sensor and a controller. The brake pad is pressed against a rotation face of a brake rotor in a direction perpendicular to the rotation face. The axial force sensor detects a pressure of the brake pad. The controller performs a speed reduction control which is an operation target, based on at least one of the pressure of the brake pad and a reduced speed obtained from a wheel speed sensor.

5 Claims, 9 Drawing Sheets

ND DEVICE

BACKGROUND

The present invention is related to an electric brake device which performs braking operation by pressing a brake pad against a rotation face of a brake rotor in a direction perpendicular thereto with an electric actuator.

Recently, in a disc brake device which is used in a vehicle, with an increase of electric cars using an electric motor as a motive power, it is impossible to employ a braking force servo device which utilizes negative pressure generated by a motive power using fuel such as gasoline. Therefore, in order to install the conventional hydraulic brake system in the electric car or the like, a servo unit such as a vacuum pump is necessary. However, in this case, brake pipes and a hydraulic control unit may increase a weight of the vehicle. In view of the above, for the purpose of reducing the weight of the vehicle and abolishing the hydraulic system, and because a regenerative brake is easily controllable, an electric brake device has been proposed. An electric disc brake is intended to press a friction member such as a brake pad against a brake rotor which is rotating, by converting a rotation torque by the electric actuator to a normal force by means of a reducer and a linear conversion device.

Further, an electric servo-disc brake which performs braking operation by a mechanical self-servomechanism utilizing a wedge action or so is employed thereby to attain higher efficiency. By employing such electric servo-disc brake, it is possible to reduce a size of the electric actuator and consumption of power, and also, contribution to an increase of a running distance of the electric vehicle such as the electric car and downsizing of a battery can be expected. In the electric brake device as described above, friction coefficient of the friction material of the friction brake is constantly fluctuated. However, to cope with such fluctuation, actual relation between a power supply value to the motor, which is the electric actuator, and a braking torque value of the brake is not gained to be utilized, and accurate control has not been performed. Under the circumstances, the electric brake which performs braking control with high accuracy as disclosed in the following Patent Document 1 has been proposed.

[Patent Document 1] Japanese Patent Publication Number 11-043041

SUMMARY

The electric brake device disclosed in the Patent Document 1, which is a first conventional example, will be described referring to FIGS. 8A and 8B. As shown in FIG. 8B, while a vehicle runs, a controller 150 estimates actual relation between a current value I supplied to motors 120, 130 and a braking torque value T imparted to wheels from a front wheel brake 122 and a rear wheel brake 132, and determines a target current supply value I* for realizing a target braking torque T* against a brake operating force F by a driver, utilizing the estimated relation. As shown in FIG. 8A, an operating force of a brake pedal 140 is inputted to the controller 150 from an operating force sensor 302, and at the same time, a reduced speed is inputted to the controller 150 from a vehicle body reduced speed sensor 310. As shown in FIG. 8C, the braking torque T is detected by a force sensor 380 according to movement of a back plate 140 of a brake pad which is press-contacted to a disc 104. The back plate 140 has a slanted face, and a normal force of a pressurizing member 134 obtained by converting a rotation driving force of the motor 120, which is an actuator, to a converted movement is smoothly self-energized by way of balls 144.

According to the electric brake device as described above, the actual relation between the current supply value I corresponding to the operating force of the brake pedal 140 and the actual braking torque value T from a brake part of the wheel is estimated, and the target current supply value I* for realizing the target braking torque T* against the brake operating force F by the driver can be determined. Therefore, it has become possible to overcome the problems of the electrical control and to perform accurate braking control. Moreover, because a self-servomechanism is employed, it has become possible to downsize the motor, which is the actuator, and to downsize a reducer in a linear converting part.

In the above described conventional electric brake device, deviation between the operating force of the brake pedal and the braking force has been overcome, and the accurate braking control as in a hydraulic brake has become possible. However, because the force sensor 380 for detecting the braking torque is disposed in a direction of travel near the back plate of the brake pad, a disposing space is limited, and the force sensor 380 is likely to be affected by friction heat of the brake pad. Moreover, due to the slanted face of the back plate of the brake pad in the self-servomechanism, there has been such possibility that fluctuation occurs in directivity of the force sensor to badly affect the accuracy of the detected values. Further, it is unavoidable that accuracy of the reduced speed which is detected from the vehicle body reduced speed sensor is deteriorated in a low speed zone from a low speed up to a stop of the vehicle.

An advantage of some aspects of the invention is to provide a electric brake device in which a stabilized braking force can be detected by an axial force sensor without using a torque sensor, and braking control can be performed with high accuracy in all speed zones, in combination with control by a detected reduced speed value.

According to an aspect of the invention, there is provided an electric brake device, comprising:

a brake pad configured to be pressed against a rotation face of a brake rotor in a direction perpendicular to the rotation face;

an axial force sensor configured to detect a pressure of the brake pad; and a controller configured to perform a speed reduction control which is an operation target, based on at least one of the pressure of the brake pad and a reduced speed obtained from a wheel speed sensor.

The controller may perform the speed reduction control based on the pressure of the brake pad without using the reduced speed, in a case where at least one of the reduced speed or a wheel speed is lower than a predetermined low speed.

The electric brake device may further comprise a mechanical holding mechanism configured to mechanically keep the pressure of the brake pad, in a case where neither the axial force sensor nor the wheel speed sensor output values in a predetermined time period.

The electric brake device may further comprise a self-servomechanism configured to increase an axial force in a direction in which the brake pad is pressed, with accompanying a rotation of the brake pad due to the pressing the brake pad against the brake rotor.

According to another aspect of the invention, there is provided a method for controlling an electric brake device, comprising:

pressing a brake pad against a rotation face of a brake rotor in a direction perpendicular to the rotation face;

detecting a pressure of the brake pad by an axial force sensor; and performing a speed reduction control which is an operation target, based on at least one of the pressure of the brake pad and a reduced speed obtained from a wheel speed sensor.

The method may further comprise a step of performing the speed reduction control based on the pressure of the brake pad without using the reduced speed, in a case where at least one of the reduced speed or a wheel speed is lower than a predetermined low speed.

The method may further comprise a step of mechanically keeping the pressure of the brake pad, in a case where neither the axial force sensor nor the wheel speed sensor output values in a predetermined time period.

DETAILED DESCRIPTION OF EXEMPLIFIED EMBODIMENTS

Figure 1:
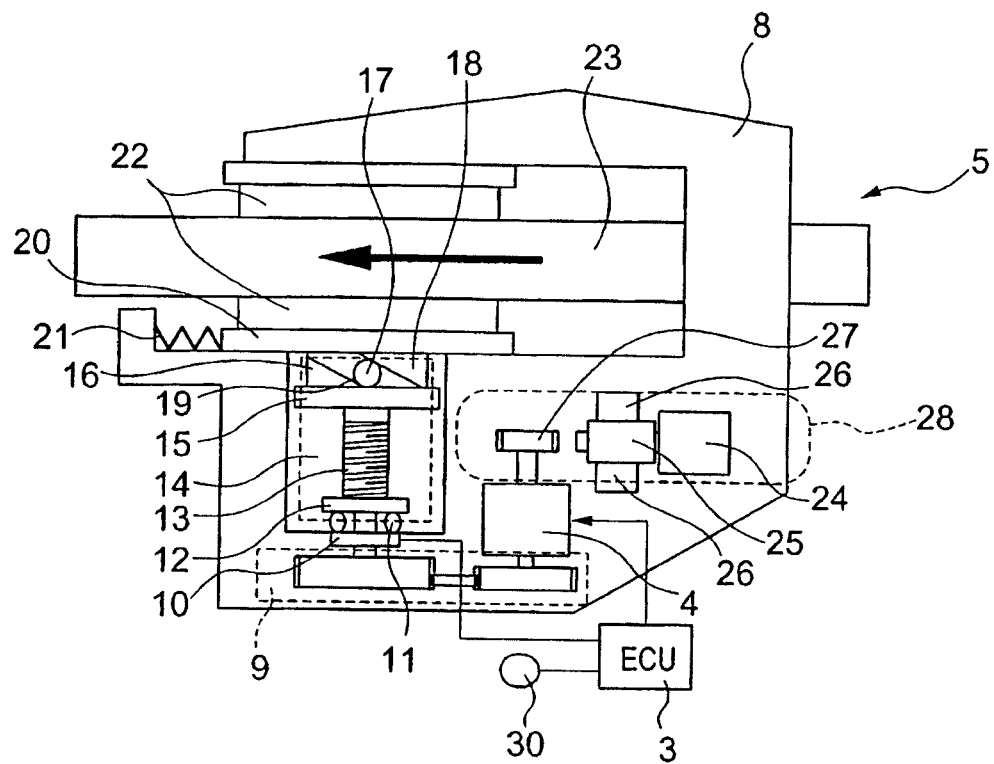
FIG. 1 is a sectional view of an essential part of an electric brake device in a first embodiment according to the invention.

Embodiments for carrying out the electric brake device according to the invention will be described referring to the drawings. The electric brake device according to the invention performs braking operation by pressing brake pads 22 against rotation faces of a brake rotor 23 in a direction perpendicular thereto with an electric actuator 4, as shown in FIG. 1, speed reduction control which is an operation target of a driver is performed at a detected value obtained from an axial force sensor 10 for detecting pressure of the brake pads 22 and a reduced speed which is obtained by arithmetical operation from a wheel speed sensor 30.

FIG. 1 is a sectional view of an essential part of a electric brake device in a first embodiment according to the invention. In FIG. 1, an electric brake device 5 is constructed as follows. A housing 8 is mounted on a stationary part of a vehicle body or so by means of a support or the like. The housing 8 is held in a floating manner with respect to the support, and constructed in such a manner that brake pads 22 which are disposed outside and inside of the housing 8 translate in a direction perpendicular to the rotation faces of the brake rotor 23 at both sides thereof. An arrow mark shows a rotation direction of the rotor 23 during the normal rotation. A motor 4 which is an electric actuator, a mechanical holding mechanism 28, a reducer 9, a rotary shaft part 13 which is a linear converter, a ball screw 14, and a self-servomechanism 19 (16, 16, 18) are contained inside the housing 8 (in a lower part in the drawing).

A rotation driving force of the motor 4, which is the electric actuator, having a rotation axis perpendicular to the rotation faces of the brake rotor 23, that is, parallel to a rotation axis of the brake rotor 23 is transmitted to the rotary shaft part 13 which is also parallel to the rotation axis of the brake rotor 23 by way of the reducer 9 including a gear train. The ball screw 14 in a tubular shape is screw-fitted to the rotary shaft part 13. The ball screw 14 converts the rotation driving force which is transmitted from the motor 4 to the rotary shaft part 13 to a linear movement, and presses the brake pads 22 against the rotation faces of the brake rotor 23 in a direction perpendicular thereto by way of an actuating plate 15, the self-servomechanism 19, and pad plates 20 thereby to perform braking operation. On this occasion, the housing 8 tends to move inwardly (downwardly in the drawing) with counteraction acting on the inner brake pad 22 thereby to generate a force for pressing the outer brake pad 22 inwardly. In this manner, the brake rotor 23 is clamped between the inner and outer brake pads 22, 22 from the inside and outside.

The self-servomechanism 19 includes a cam plate 16 which is fixed to the actuating plate 15 at a side close to the ball screw 14, a cam plate 18 which is fixed to the pad plate 20, and a ball 17 which is interposed between these cam plates. When the pad plate 20 moves in association with the rotation of the brake rotor 23 against a spring 21, during the braking operation, axial forces of the brake pads 22 in a pressing direction are increased by cam action between the ball 17 and slanted faces of the cam plates 16, 18 which are opposed to each other. The rotary shaft part 13 to which the ball screw 14 is screw-fitted is provided with an aligning plate 12, which assists, in combination with an aligning bearing 11, directivity of the linear converter, that is, accuracy of the right angle with respect to the rotation faces of the brake rotor 23 to be enhanced and maintained.

The axial force sensor 10 is disposed in a tight-closed space behind the ball screw 14, and a repulsive force of the braking force against the rotation faces of the brake rotor 23 during the braking operation is accurately detected by this axial force sensor 10 without being affected with heat, water and dust. On the other hand, a motor rotor 27 having a gear is provided so as to protrude at a side remote from an output shaft of the motor 4. A latch 25, which is adapted to advance inside a case 26 by interruption of current through a solenoid 24, after a certain time has passed from interruption of outputs from the wheel speed sensor 30 and the axial force sensor 10, is locked to the motor rotor 27 having the gear, thereby to mechanically hold the pressing action of the brake pads 22 against the rotor. Therefore, a continuous flow of excessive current to the motor 4, which is the electric actuator, is prevented. In this manner, consumption of the power can be reduced, deterioration of the electric actuator can be restrained, and at the same time, mechanical parking brake is realized. As the results, even though the driver keeps on treading the brake pedal when the vehicle stops temporarily at a crossing or so, the power to be consumed in the power brake can be depressed.

Figure 3:
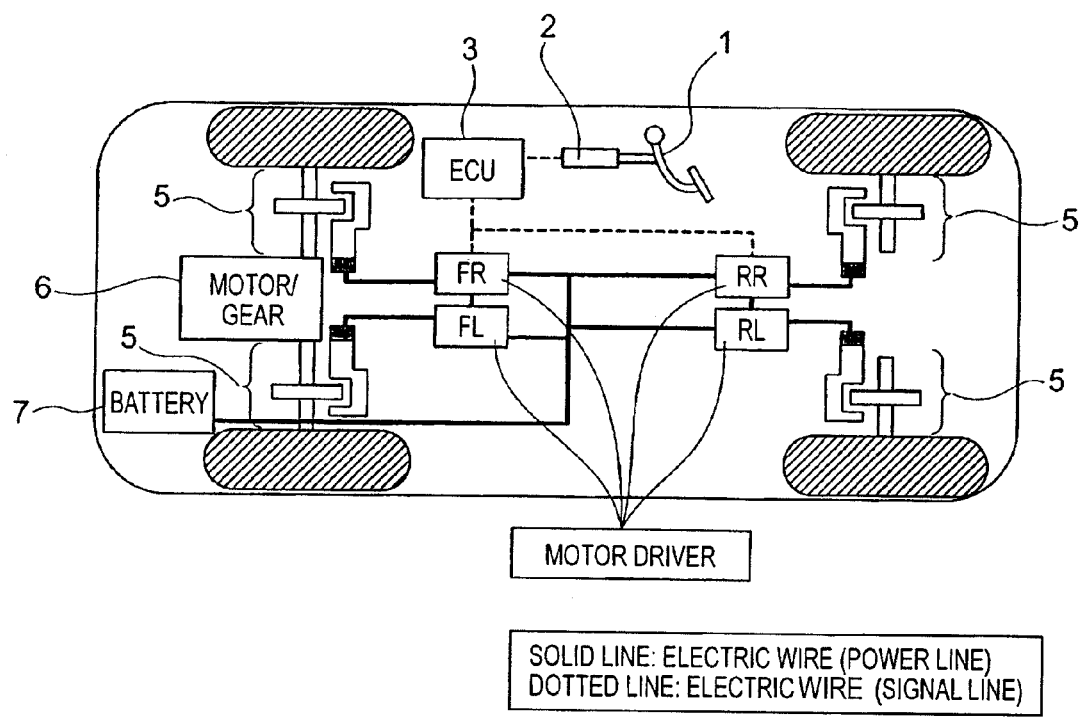
FIG. 3 is a view showing an example of a vehicle system in which the electric brake device according to the invention is employed.
Figure 4:
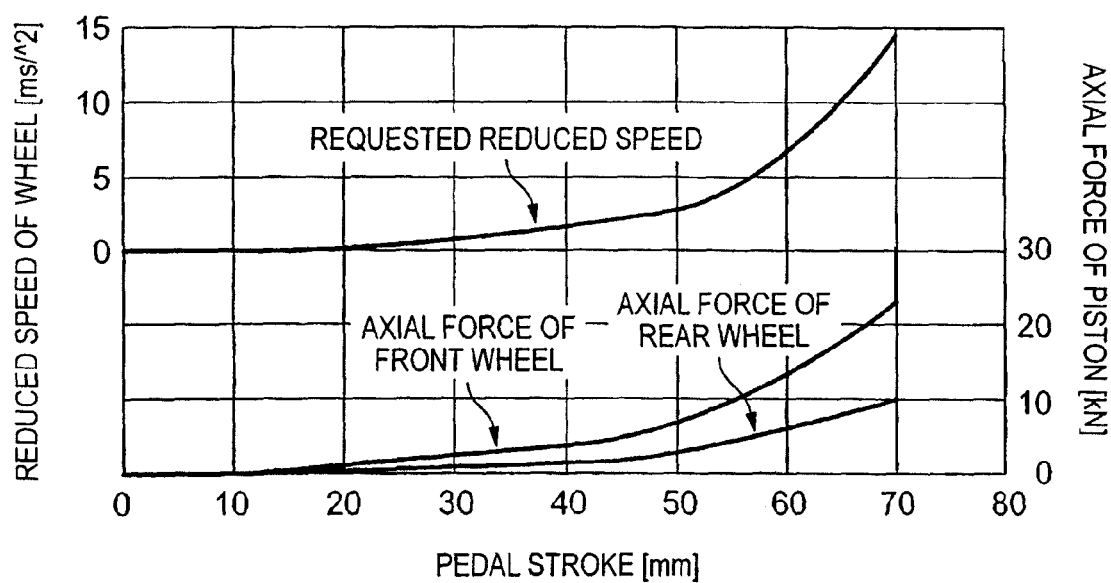
FIG. 4 is a table showing an example of relation between pedal strokes and requested reduced speeds.

FIG. 3 is a view showing an example of a vehicle system in which the electric brake device according to the invention is employed. Reference numeral 6 represents a driving mechanism including a transmission and so on in which a motor is used as a motive power. Electric energy as the motive power is obtained from a battery 7, and at the same time, electric power for the electric actuator and so on in the brake device is also obtained from the battery 7. When the driver treads a brake pedal 1, the requested reduced speed of a vehicle (a braking force) is determined according to a brake pedal treading force and a pedal stroke in an ECU (control means for braking control) 3 through a stroke simulator 2. The reduced speed is determined referring to a table of relations among a pedal stroke, a reduced speed of wheel and an axial force of piston, as shown in FIG. 4. The reduced speed (braking force) of each of the wheels is supplied to a motor driver of the electric actuator 4 in the power brake 5 which is provided on each of the wheels. As operating means, not only the brake pedal but also a lever or the like which is not shown in FIG. 3 is used in some cases. The ECU 3 which is the control means for the braking control may be also used as control means for controlling the vehicle. However, commands for antilock control of the wheel and restraint of transverse slip of the vehicle body to be controlled by a controlling ECU for controlling the vehicle, which is separately provided, are performed in preference to a request of the driver.

Figure 5:
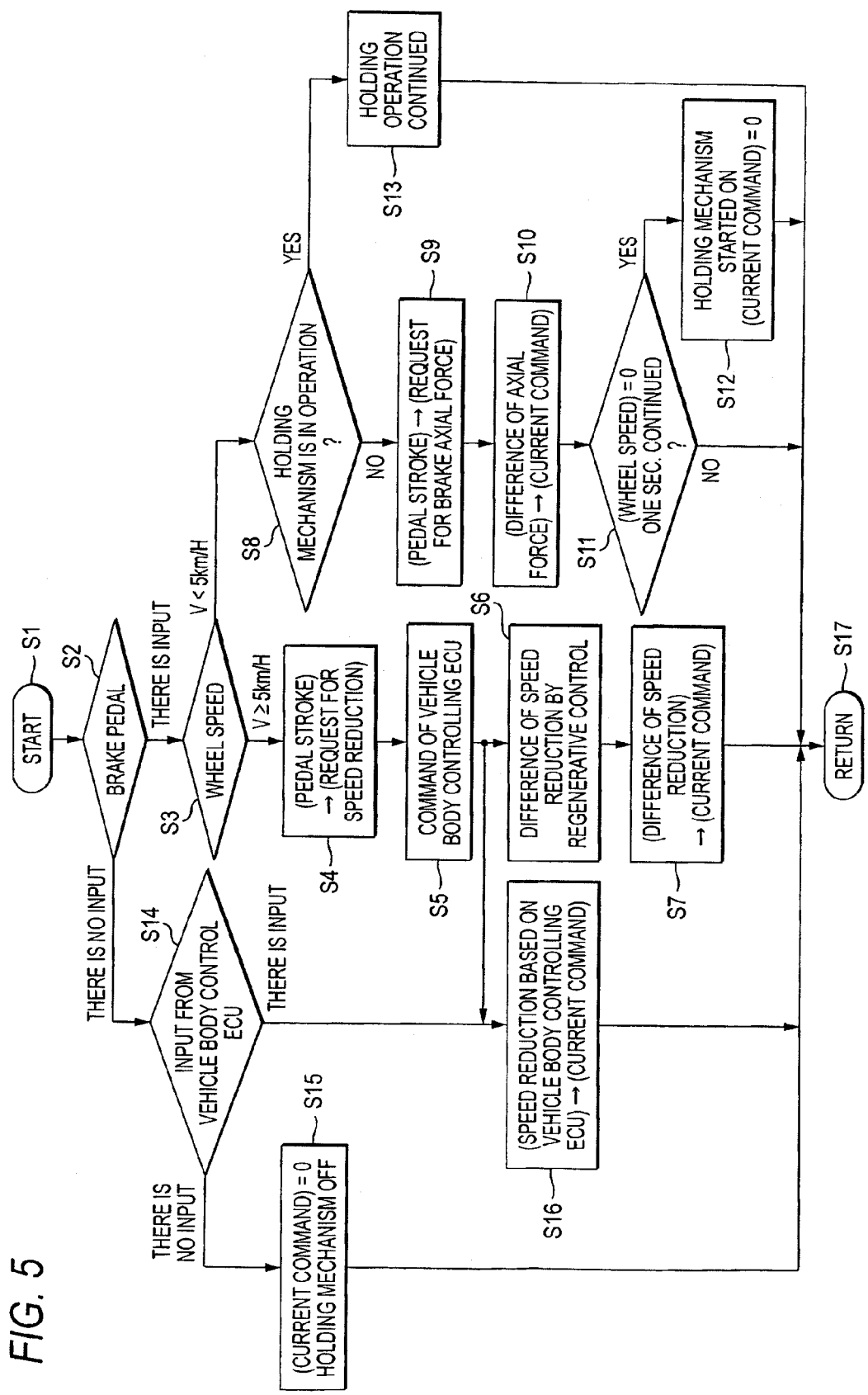
FIG. 5 is a flow chart showing an example of braking control in the electric brake device according to the invention.

FIG. 5 is a flow chart showing an example of the braking control in the electric brake device according to the invention. In step S1, speed reduction (braking) control is started, and in step S2, treading action of the brake pedal is judged. In case where there is no treading action, nor an input from the vehicle body controlling ECU in step S14, a current command is zero, and the holding mechanism (a parking brake) is released. In case where there is an input from the vehicle body controlling ECU in step S14, speed reduction control based on the current command from the vehicle body controlling ECU, for example, transverse slip control for preventing over-steering during the rotation is performed in step S16. In case where the treading action of the brake pedal is confirmed in step S2, a wheel speed is judged in step S3. In case where the wheel speed V is a normal speed over 5 km/h, for example, request for speed reduction according to a pedal stroke is made in step S4. In step S5, a command of the vehicle body controlling ECU is issued, and in step S16, a command for speed reduction control based on the command of the vehicle body controlling ECU is also issued. Besides, proceeding to step S6, a difference of speed reduction by regenerative control for recovering braking energy during the braking operation by a driving motor is added, and in step S7, speed reduction control by the current command taking the difference of the speed reduction into consideration is performed.

In case where it is judged in step S3 that the wheel speed V is lower than a determined very low speed, for example, 5 km/h, whether or not the holding mechanism is in operation is judged in step S8. In case where it is judged that the holding mechanism is in operation, the holding mechanism continues to be operated in step S13. In case where it is judged in step S8 that the holding mechanism is not in operation, proceeding to step S9, a request for brake axial force based on a value detected from the pedal stroke by the axial force sensor is made, and in step S10, speed reduction control is performed by a current command based on a difference of the axial force. In case where it is confirmed in step S11 that the wheel speed=0, in short, the vehicle has stopped, and for example, one second has passed, the holding mechanism starts to be operated, and the current command becomes zero in step S12, to be returned to START in step S1. The control is performed at a control cycle of 1 ms, for example, between START and RETURN, and this control is repeated.

Figure 6:
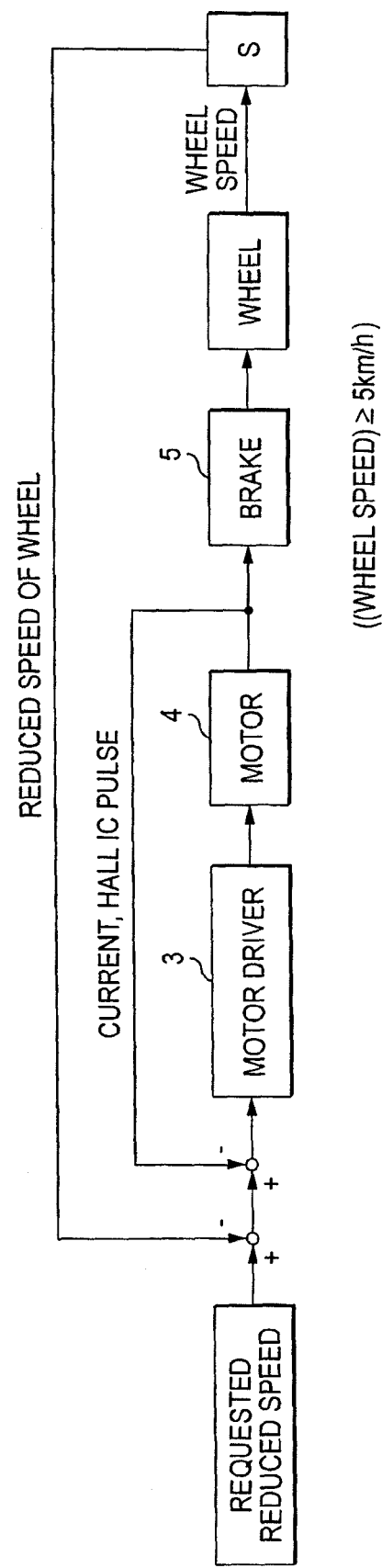
FIG. 6 is a block diagram showing speed reduction control system at the normal speed.

FIG. 6 is a block diagram showing speed reduction control system at the normal speed. At the normal speed of the wheel over 5 km/h, for example, against the reduced speed requested by the operator, the wheel speed is calculated from the wheel speed sensor which is provided in each of the wheels, and the reduced speed of the wheel which is obtained by differentiating the wheel speed is fed back to calculate a difference from the requested value, and the current command of the electric actuator controls the current of the electric actuator so as to make the difference zero. In the electric vehicle, because regenerative control by the driving motor is also performed during the speed reduction, a braking power by the regenerative control is added to the value requested by the operator, when the command value of the power brake is determined. The regenerative control is performed by the driving motor controlling ECU. Even though friction coefficient of the brake pad is varied during the braking operation, the reduced speed to be outputted is not varied. Therefore, it is possible to contribute to stability of the braking operation, and consumption of the electric power can be depressed by employing the self-servo type disc brake. Moreover, because the control can be performed by employing an existing wheel speed sensor, it is possible to contribute to reduction of the cost.

Figure 7:
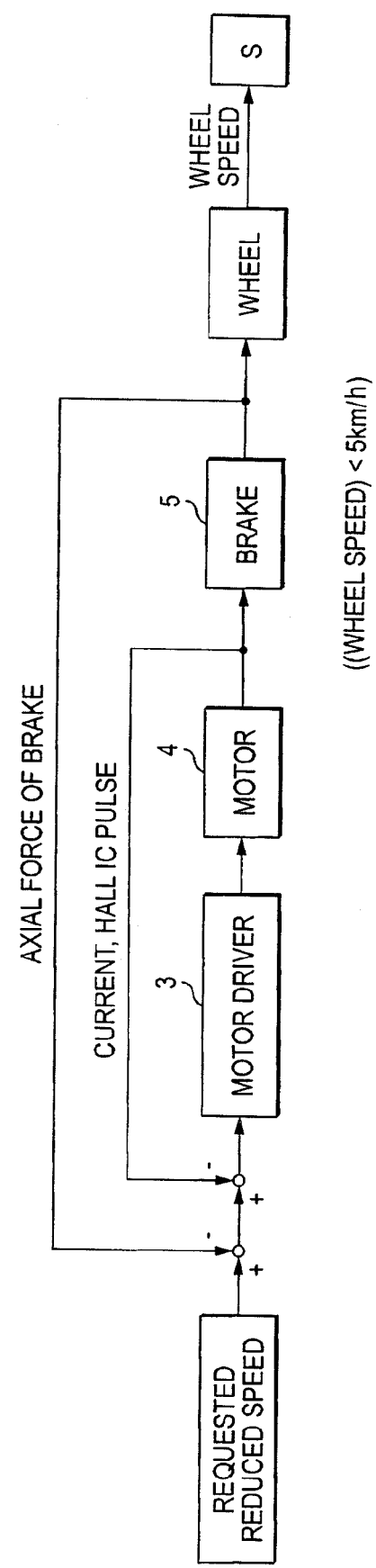
FIG. 7 is a block diagram showing the speed reduction control system below a determined very low speed.
Figure 8A:
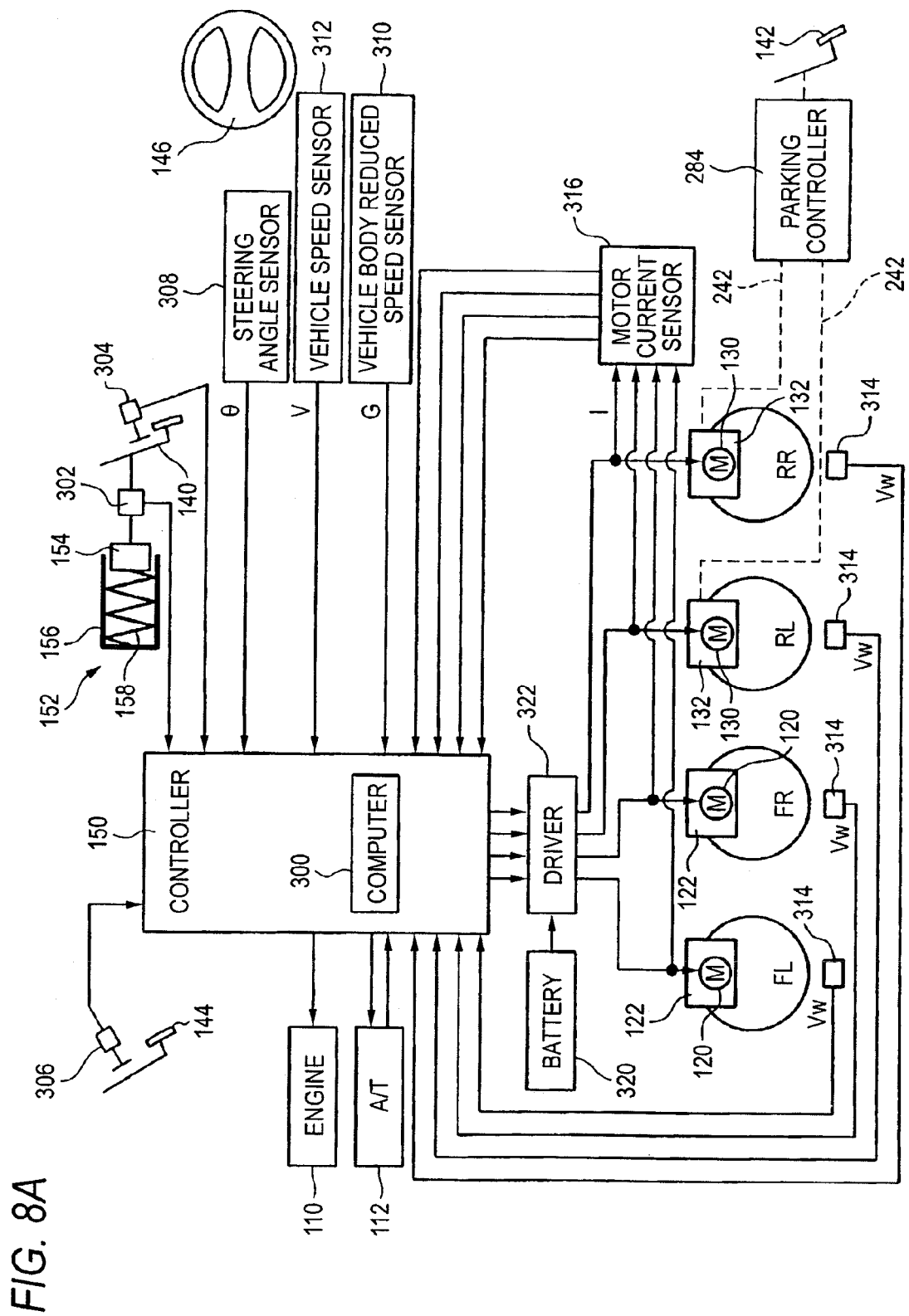
FIGS. 8A to 8C are explanatory views of a conventional electric brake device.
Figure 8B:
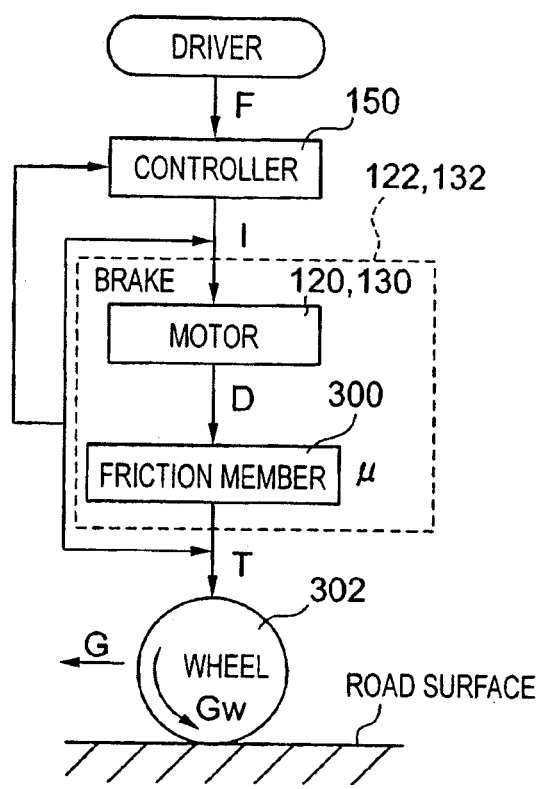
Figure 8C:
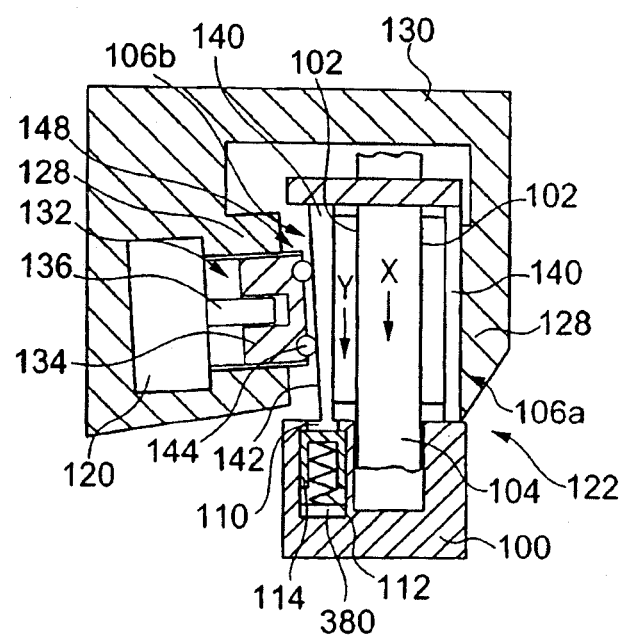

FIG. 7 is a block diagram showing the speed reduction control system below the determined very low speed. At the very low wheel speed below 5 km/h, for example, accuracy of arithmetical operation for speed reduction of the wheel speed which is detected from the wheel speed sensor is deteriorated, and consequently, accuracy of the reduced speed to be fed back is also deteriorated. When the vehicle stops, the reduced speed to be fed back becomes zero, and in case where the request of the operator stays at the reduced speed, the current more than required is supplied to the electric actuator. Therefore, the control based on the feedback of the reduced speed of the wheel as shown in FIG. 6 is not favorable, and shifted to the feedback control of the brake axial force employing the axial force sensor as shown in FIG. 7. The control is shifted to a current command control to the electric actuator, by using the value requested by the operator as the axial force of the brake piston (the ball screw in the embodiment). By performing such control, it is possible to very accurately perform the braking control at the value detected from the axial force sensor, without using the wheel speed or the reduced speed of which the accuracy is deteriorated at the very low speed.

Figure 2:
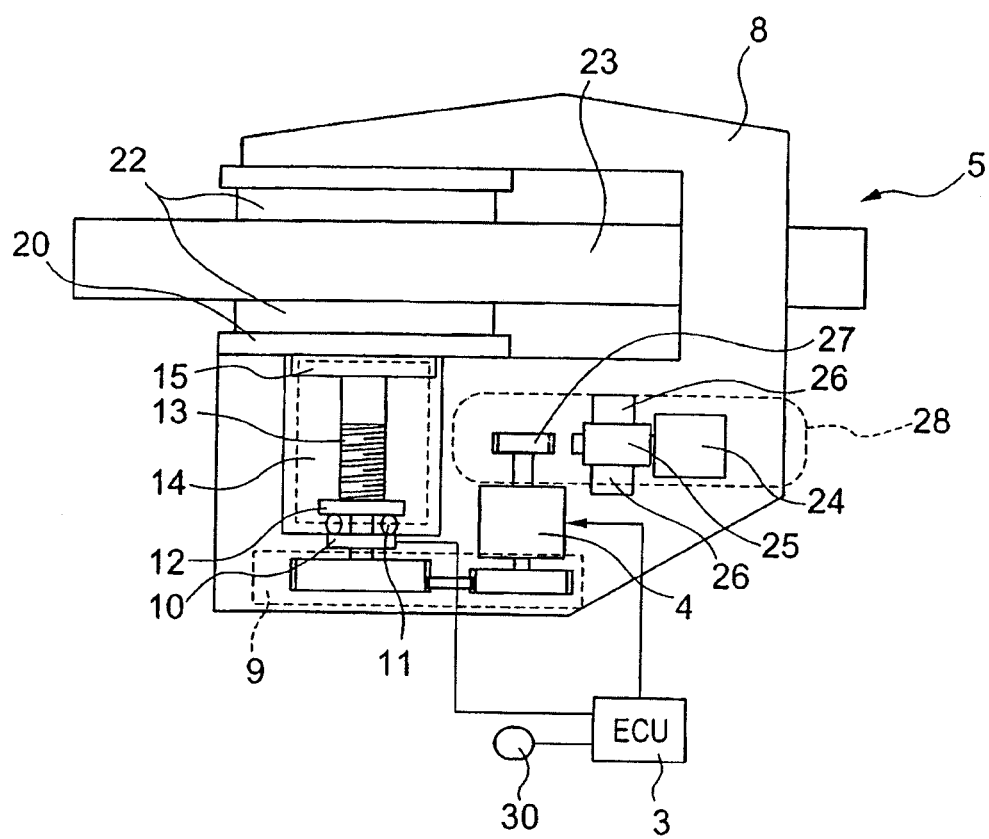
FIG. 2 is a sectional view of an essential part of an electric brake device in a second embodiment according to the invention.

FIG. 2 is a sectional view of an essential part of an electric brake device in a second embodiment according to the invention. Described in this embodiment is an example of structure of the power brake which is not provided with the self-servo-mechanism. A difference between the embodiment in FIG. 1 and this embodiment lies in that the actuating plate 15 which is disposed at the side close to the ball screw 14 in FIG. 1 is disposed in direct contact with the pad plate 20, in this embodiment. Therefore, the brake axial force which is obtained by pressing the brake pads 22, 22 against the brake rotor 23 is directly detected with high accuracy by the axial force sensor 10 disposed in the tight-closed space behind the ball screw 14, which is the linear converter, without being affected with heat, water and dust. Because the self-servo-mechanism is not provided in this embodiment, the braking torque which is generated at the inputted axial force command value is not remarkably varied according to change in speed and friction coefficient. Although downsizing of the motor which is the electric actuator is not fulfilled, it is possible to perform feedback control of the axial force based on the axial force value detected by the axial force sensor, which can attain enhanced directivity, and is unlikely to be affected with heat, and by which the detected value of the axial force can be obtained with high accuracy.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

For example, a shape and type of the motor as the electric actuator, shapes and types of the brake pad and the pad plate, a shape and type of the axial force sensor, a mode of arithmetical operation of the reduced speed from the sensor, and a shape and type of the self-servomechanism can be appropriately selected within a scope of the gist of the invention. A mode of linear conversion from the rotation of the electric actuator up to pressing of the brake pad may be a combination of the rotary shaft part and a pantograph, and so on. And a position of the axial force sensor may be a position perpendicularly remote from the brake rotor which generates braking heat, and behind the ball screw of the rotary shaft part which has been aligned, etc. A shape and type of the wheel speed sensor may be various types of general-purpose sensors. A mode for setting the operation target of the driver may be appropriate operation target setting means. A mode for shifting from the speed reduction control to the control of the axial force value may be configured to be smoothly shifted by gain control at the time of switch. A mode for mechanically holding the brake with the latch by interruption of the current in the solenoid may be such that the motor rotor can be clamped from outside by means of a ring member having split inner teeth. And the gear of the reducer may be held. Moreover, the elements described in the embodiments are only examples in every respect, and must not be interpreted in a limited way.

The electric brake device according to the invention can be preferably applied to an electric car, but also can be adopted as a brake of a railway car such as an electric train. Moreover, the electric brake device can be also applied to a hybrid car which is also provided with a fuel-type engine.

The disclosures of Japanese Patent Application No. 2009-280401 filed Dec. 10, 2009 including specification, drawings and claims is incorporated herein by reference in its entirety.

What is claimed is:

1. An electric brake device, comprising:
   a brake pad configured to apply a pressure against a rotation face of a brake rotor in a direction perpendicular to the rotation face;
   a linear converter configured to convert a driving force of a motor into a linear movement to transmit the linear movement to the brake pad;
   an axial force sensor, provided at the linear converter, and configured to detect a brake axial force obtained by the pressure by the brake pad; and
   a controller configured to perform a speed reduction control which is an operation target, and configured to obtain a speed from a wheel speed sensor;
   wherein the controller is configured to perform the speed reduction control based on the brake axial force in a case where the speed is higher than zero and lower than a predetermined speed, and to perform the speed reduction control based on the speed obtained from the wheel speed sensor in a case where the speed is higher than or equal to the predetermined speed.

2. The electric brake device as set forth in claim 1, further comprising:
   a mechanical holding mechanism configured to mechanically keep the pressure of the brake pad, in a case where neither the axial force sensor nor the wheel speed sensor output values in a predetermined time period.

3. The electric brake device as set forth in claim 1, further comprising:
   a self-servomechanism configured to increase an axial force in a direction in which the brake pad applies the pressure, with accompanying a rotation of the brake pad, when the brake pad applies the pressure against the brake rotor.

4. A method for controlling an electric brake device, comprising:
   applying a pressure by a brake pad against a rotation face of a brake rotor in a direction perpendicular to the rotation face via a linear converter configured to convert a driving force of a motor into a linear movement to transmit the linear movement to the brake pad;
   detecting a brake axial force obtained by the pressure by the brake pad by an axial force sensor provided at the linear converter;
   obtaining a speed from a wheel speed sensor;
   determining whether the speed is lower than a predetermined speed;
   performing a speed reduction control which is an operation target, based on the brake axial force in a case where the speed is higher than zero and lower than the predetermined speed; and
   performing the speed reduction control based on the speed in a case where the speed is higher than or equal to the predetermined speed.

5. The method as set forth in claim 4, further comprising:
   mechanically keeping the pressure of the brake pad, in a case where neither the axial force sensor nor the wheel speed sensor output values in a predetermined time period.

* * * * *